(12) United States Patent
Okamoto et al.

(10) Patent No.: US 7,591,576 B2
(45) Date of Patent: Sep. 22, 2009

(54) ILLUMINATOR AND IMAGE READER EMPLOYING IT

(75) Inventors: Tatsuki Okamoto, Tokyo (JP); Akira Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 11/718,650

(22) PCT Filed: Nov. 2, 2005

(86) PCT No.: PCT/JP2005/020205

§ 371 (c)(1),
(2), (4) Date: May 4, 2007

(87) PCT Pub. No.: WO2006/049206

PCT Pub. Date: May 11, 2006

(65) Prior Publication Data

US 2008/0151553 A1    Jun. 26, 2008

(30) Foreign Application Priority Data

Nov. 5, 2004    (JP) .............................. 2004-322212

(51) Int. Cl.
F21V 5/00    (2006.01)

(52) U.S. Cl. .................. 362/582; 362/217.02; 362/328; 355/1; 358/475; 358/484

(58) Field of Classification Search ................. 362/217, 362/221, 328, 582, 217.02; 355/67, 229, 355/1; 399/21; 358/471, 474, 475, 480, 358/482, 484, 487
See application file for complete search history.

(56) References Cited

U.S. PATENT DOCUMENTS

| | | | |
|---|---|---|---|
| 4,924,357 A | 5/1990 | Yamashita et al. | |
| 5,416,608 A | 5/1995 | Ueda et al. | |
| 5,969,343 A | 10/1999 | Nakamura et al. | |
| 6,538,243 B1 | 3/2003 | Bohn et al. | |
| 7,085,023 B2 | 8/2006 | Okamoto et al. | |
| 2003/0076551 A1* | 4/2003 | Kawai et al. | 358/475 |
| 2003/0127520 A1 | 7/2003 | Aizawa et al. | |

FOREIGN PATENT DOCUMENTS

| | | |
|---|---|---|
| JP | 2001 77975 | 3/2001 |
| JP | 2002 232648 | 8/2002 |

* cited by examiner

*Primary Examiner*—Stephen F Husar
(74) *Attorney, Agent, or Firm*—Oblon, Spivak, McClelland, Maier & Neustadt, L.L.P.

(57) ABSTRACT

An illuminator includes a light guide having a circular cross-section, a scatterer that is provided on a portion of the circumference of the circular cross-section and that radiates scattering light toward the inside of the light guide, and a condensing lens that condenses light emitted from the light guide and transforms the light into a linear beam, a planar beam, or a point-like beam. In the illuminator light from the light source is effectively utilized, and the light can efficiently illuminate the required illumination area. In addition, an image reader apparatus can perform high-speed reading using such an illuminator.

8 Claims, 12 Drawing Sheets

(a)  (b)

ILLUMINATOR AND IMAGE READER EMPLOYING IT

TECHNICAL FIELD

The present invention relates to illuminators, and particularly to enhancement in light intensity of a required illumination area. In addition the present invention relates to an image reader apparatus employing such an illuminator.

BACKGROUND ART

A conventional illuminator employed by an image reader apparatus or the like includes a lot of light sources arranged, such as LEDs, and transparent material guiding light emitted from the light sources. The illuminator lets the light from the light sources travel through the transparent material, and guides the light to a linear image reading area, whereby the surface of a document is uniformly illuminated(see, for example, Patent Document 1).

Moreover, in an illuminator according to another example, a transparent rod whose light outgoing face is a convex curved surface is used as a light guide, a light diffusion area is provided in the plane facing the curved surface, and LED devices as a light source are fixed on both ends of the transparent rod, to achieve a linear illuminator(see, for example, Patent Document 2).

Patent document 1: Japanese Patent Laid-Open No. 77975/2001

Patent document 2: Japanese Patent Laid-Open No. 232648/2002

DISCLOSURE OF THE INVENTION

Problem that the Invention is to Solve

However, in the conventional illuminator described in Patent Document 1, there has been a problem in that, when the light from the light source travels through the transparent material, the configuration of combination lenses composed of the transparent material is complicated, and high accuracy is required in manufacturing the combination lenses.

Moreover, in the conventional illuminator described in Patent Document 2, there has been a problem in that the cross-sectional shape of the transparent rod is configured in such a way that a convex curve is connected at a right angle to both ends of the side opposed to the curve, and both side surfaces of the transparent rod are composed of planar portions, so that the light reflected on the planar portions is radiated to the direction different from the illumination area, and light use efficiency goes down.

The present invention has been made to resolve such problems, and provides an illuminator having a simple configuration, in which light from the light source is effectively utilized, and the light can efficiently illuminate the required illumination area.

In addition, it is an object to provide an image reader apparatus that can perform high-speed reading using such an illuminator.

Means for Solving the Problem

An illuminator relevant to the present invention includes: a light guide having a circular cross-section; a scatterer that is provided on a portion of the circumference of the circular cross-section and that radiates scattering light toward the inside of the light guide; and a condensing lens that condenses light emitted from the light guide and transforms the light into a linear beam, a planar beam, or a point-like beam.

In addition, an image reader apparatus relevant to the present invention includes: a transparent plate on which a document is placed; an illuminator that irradiates with light a document surface where the document is placed; an condensing optical system that condenses light reflected on the document surface, or light transmitted through the document surface; and a sensor that is provided in an imaging portion of the condensing optical system and reads the document image. The illuminator is realized using an illuminator according to the present invention.

Effects of the Invention

The illuminator according to the present invention has a light guide with a circular cross-sectional shape, so that the light radiated from the light guide is never radiated to the direction that is significantly different from the illumination area. In addition, the condensing lens efficiently condenses the light radiated from the light guide, and guides the light to the required illumination area, so that the light can efficiently illuminate the required illumination area, and the light intensity can be enhanced.

In addition, the image reader apparatus according to the present invention reads images using the above-described illuminator, so that the light intensity is enhanced, and high-speed reading can be performed.

DESCRIPTION OF THE SYMBOLS

1: case, 2: cover glass, 3: document, 4: platen, 5: light source, 6: rod lens array, 7: line sensor IC, 8: sensor board, 9: light guide, 10: cylindrical light guide, 11: scatterer, 12, 112, 212: cylindrical lenses, 13, 14, 15: connecting portions, 16, 50: air spaces, 41: main scanning direction, 42: sub scanning direction, 43: document feed direction, 51: light source case, 52: red light source, 53: green light source, 54: blue light source.

BEST MODE FOR CARRYING OUT THE INVENTION

Embodiment 1

Figure 1:
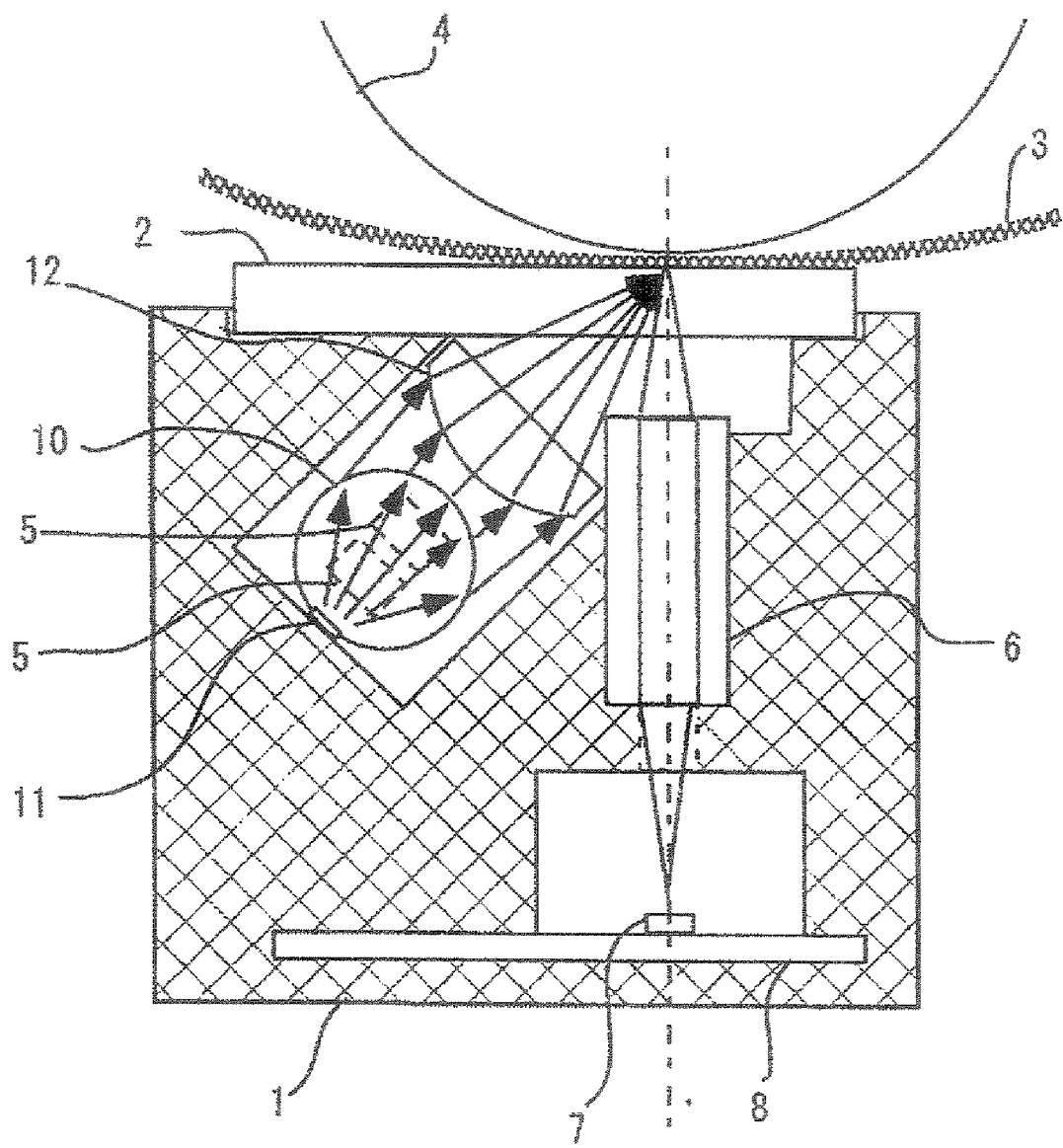
FIG. 1 is a configuration diagram illustrating a shorter-axial-direction (sub-scanning-direction) cross-section of an image reader apparatus according to Embodiment 1 of the present invention.
Figure 2:
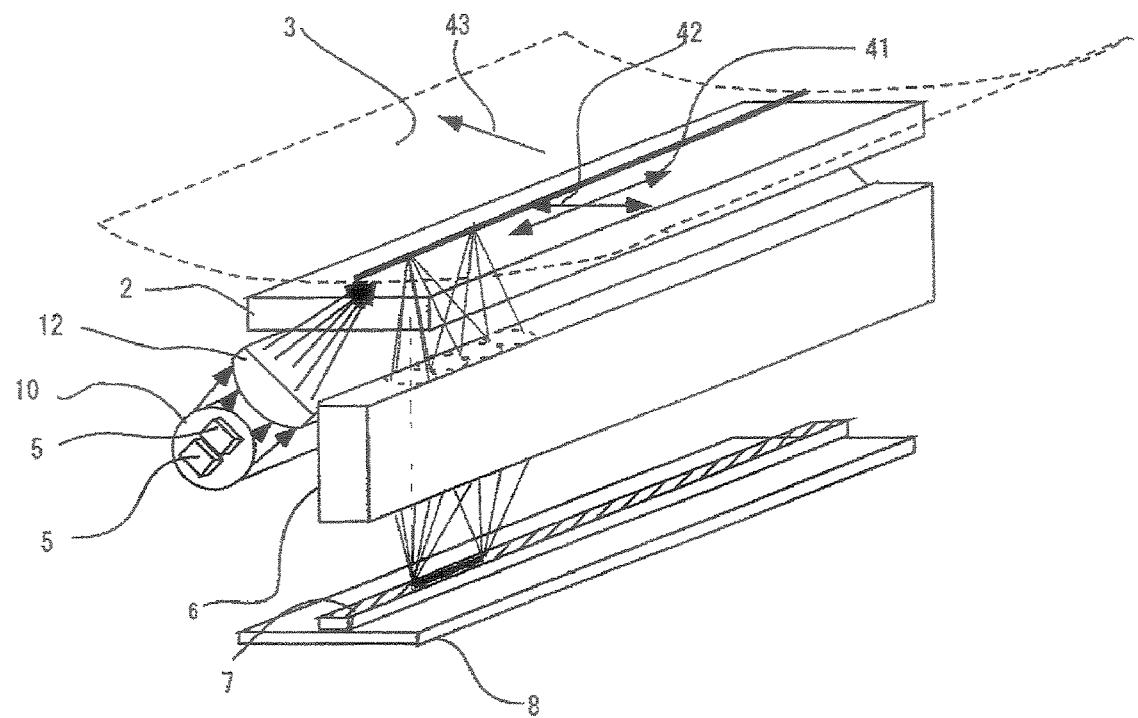
FIG. 2 is a perspective configuration diagram illustrating the image reader apparatus according to Embodiment 1 of the present invention.

FIG. 1 is a configuration diagram illustrating a shorter-axial-direction (sub-scanning-direction) cross-section of an image reader apparatus according to Embodiment 1 of the present invention. Here, the "shorter axial direction" means a direction perpendicular to the direction in which line sensors are arranged, and is a document feed direction, and is also referred to as a sub scanning direction. In the meantime, a "longer axial direction" means a direction parallel to the direction in which line sensors are arranged, and is also referred to as a main scanning direction. FIG. 2 is a perspective configuration diagram illustrating the image reader apparatus according to Embodiment 1 of the present invention.

In the image reader apparatus, a document 3 is sandwiched between a platen 4 and a cover glass 2, which is a transparent plate on a case 1, and is fed by the platen 4. The case 1 includes an illumination optical system and a reading optical system under the cover glass 2. The illumination optical system includes a light guide 10, a scatterer 11, and a condensing lens 12. The illumination optical system guides emission light from light sources 5 such as LEDs to a position where the document 3 is read, and irradiates the document 3 to be read with the light through the glass 2. The position where the document 3 is read is linear along the main scanning direction 41. The reading optical system includes a rod lens array 6 and a sensor board 8 on which a line sensor IC 7 is mounted. The reading light reflected from the document 3 is printed to the line sensor IC 7 as a one-to-one right image by the rod lens array 6, and is transformed into electrical signals by the line sensor IC 7. The document 3 is moved to the document feed direction 43 by the platen 4, so that the linear illumination light is scanned in the sub scanning direction 42 on the document. As a result, the information on the entire surface of the document is transformed into electrical signals.

In the image reader apparatus, the illumination optical system is appropriately adjusted so that the light from the light sources 5 adequately reaches the document 3, and the reading optical system is appropriately adjusted so that the light from the document 3 adequately reaches the line sensor IC 7.

Hereinafter, the illumination optical system according to the present Embodiment 1 will be described in detail. The light guide 10 according to the present embodiment has a cylindrical shape, and the scatterer 11 is provided on the side surface of the cylindrical light guide 10 along the axial direction. The scatterer 11 on the side surface of the cylindrical light guide is positioned opposed to the face from which the illuminating ray emits out of the cylindrical light guide 10. The light sources 5 are provided on both the axial end surfaces or either of the axial end surfaces of the cylindrical light guide 10. The light emitted from the light sources 5 is trapped in the cylindrical light guide 10, and propagates through the cylindrical light guide 10. The light propagating through the cylindrical light guide 10 shines on the scatterer 11 provided on the side surface of the cylindrical light guide 10 along the axial direction, and is scattered. Part of the scattered light is radiated out of the cylindrical light guide 10 in the direction in which the illuminating ray radiates.

Figure 3:
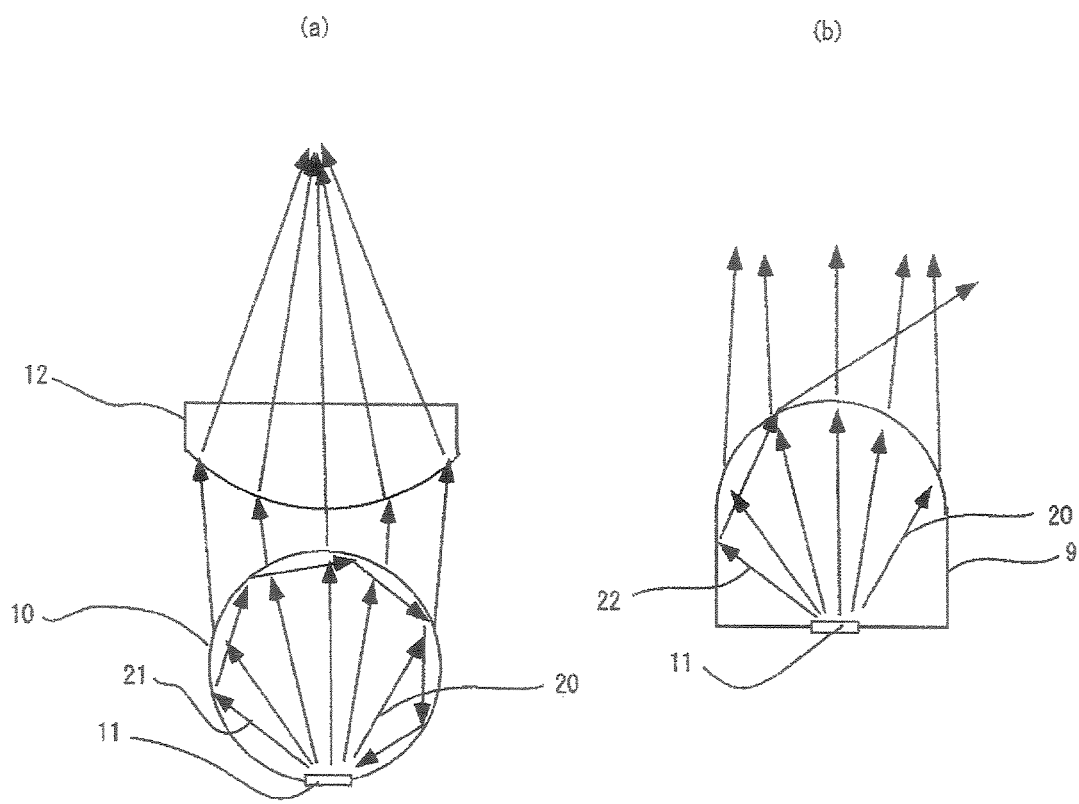
FIG. 3 is a diagram illustrating operations of an illumination optical system of the image reader apparatus according to Embodiment 1 of the present invention and of a conventional illumination optical system.

FIG. 3(a) is a diagram illustrating optical rays of the illumination optical system of the image reader apparatus according to Embodiment 1 of the present invention. In FIG. 3, arrows indicate ray paths. In the present Embodiment 1, because the light guide 10 has a cylindrical shape, the light trapped in the cylindrical light guide 10 is scattered by the scatterer plate 11, and the light 20 scattered by the scatterer other than the light emitted from the cylindrical light guide 10 approximately in the illuminating ray radiating direction is confined again within the cylindrical light guide according to the total reflection condition (a ray 21), to be scattered by the scatterer 11 again. As a result, no light loss is caused.

The light emitted from the cylindrical light guide 10 approximately in the illuminating ray radiating direction is condensed by the condensing lens 12, and is focused in the reading area. In the present embodiment, the condensing lens 12 is a cylindrical lens, and the light emitted from the cylindrical light guide 10 is condensed into a linear beam extending along the direction perpendicular to the paper face in FIG. 3(a).

In the present embodiment, because the cylindrical light guide 10 is cylindrical, a belt-like beam with a certain degree of uniform directivity can be efficiently obtained. The light emitted from the cylindrical light guide 10 is efficiently transformed into a linear beam by the cylindrical lens 12.

FIG. 3(b) is a diagram illustrating optical rays of a conventional illumination optical system. In the conventional illumination optical system illustrated in the figure, the light outgoing face of a light guide (a transparent rod) 9 is a convex curved surface, and both side surfaces of the transparent rod have plane portions. Therefore, the light trapped in the light guide 9 propagates mainly through the light guide until it is scattered by a scatterer 11; however, out of rays 20 scattered by the scatterer 11, a ray 22 scattered toward the side surface (the plane portion) of the light guide 9 is emitted from the curved surface portion of the light guide 9 in a direction different from the illuminating ray radiating direction, which will be a loss.

As described above, the illumination optical system in which the cylindrical light guide 10 and the cylindrical lens 12 according to the present embodiment are combined causes little light outgoing in the direction largely different from the direction of the illumination area, and the light loss is significantly reduced compared with the conventional illumination optical system, so that an illumination optical system with high light-use efficiency is achieved.

In addition, the condensing lens efficiently condenses the light radiated from the light guide, and guides the light to the required illumination area, so that the light can efficiently illuminate the required illumination area, and the light intensity can be enhanced.

Here, in consideration of the size of the LEDs as light sources 5 and downsizing of the device, a suitable diameter of the cylindrical light guide 10 is between 2 mm and 5 mm, and more preferably between 3 mm and 4 mm. In this case, by configuring the radius of curvature of the cylindrical lens 12 to be around 2 mm to 4 mm, the illuminating light can be controlled to be a condensed light flux or an approximately parallel light flux around the surface of the document.

The cylindrical surface of the cylindrical lens 12 can be an aspherical surface such as ellipsoid and paraboloid. This enables further efficient control of the illuminating light flux.

In addition, the diameter of the cylindrical light guide 10 is not limited to the above-described value range, but can be appropriately selected in accordance with a device employing the illumination optical system according to the present embodiment. Moreover, the radius of curvature of the cylindrical lens can be determined in accordance with a required specification of the illuminating light.

Furthermore, it is only necessary that materials for the cylindrical light guide 10 and the cylindrical lens 12 are transparent materials. Resin material such as acrylic and polycarbonate, or glass material can be used.

The scatterer 11 is optically coupled with the light guide 10, and is configured so as to scatter the light within the light guide. As a scatterer, a portion of the cylindrical light guide 10 painted with white pigment, and a portion of the cylindrical light guide itself finished by forming prismatic shapes or embossed shapes are conceivable, for example. "A portion finished by forming prismatic shapes" means a portion of the side surface of the light guide 10 on which cutouts whose cross-sectional shape is triangular are formed along the axial direction. The triangular cutout can be a cross-section of any of configurations including a triangular pyramid, a quadrangular pyramid, and a triangular prism. "A portion finished by forming embossed shapes" means a portion of the side surface of the light guide 10 on which cutouts whose cross-sectional shape is circular are formed along the axial direction. In this case, the circular cutout can be a cross-section of any of configurations including a sphere and a circular cylinder. The circular cutouts can be replaced by elliptical cutouts or the like. In each case, it is not necessary to form the cutouts continuously. The cutouts may be discretely formed. The light that has fallen on the cutout surface is reflected out of the total reflection condition, whereby an effect similar to diffusion can be obtained.

In addition, when the prismatic shapes or the embossed shapes are formed, a light guide case having an effect of reflecting or scattering light can be arranged in the position outside of the light guide, opposed to the portion where the prismatic shapes or the embossed shapes are formed, or in the position opposed to the portions other than the light outgoing face of the light guide. By arranging the light guide case, the light leaking from the cutouts of the prismatic shapes or the embossed shapes to the outside of the light guide can be returned again into the light guide 10. As a result, the scattering effect can be enhanced. In this case, a portion of the cylindrical light guide itself finished by forming prismatic shapes or embossed shapes, and such a surface inside the light guide case are in combination referred to as a scatterer.

When the light sources 5 are arranged on one end surface of the cylindrical light guide 10, the intensity of outgoing light of the light guide 10 is not uniform along the axial direction of the light guide 10. In order to uniform the intensity, it is only necessary to control the scattering of the scatterer 11 in the axial direction of the light guide 10. Hereinafter, a specific example thereof will be described. When the scatterer 11 is made by painting with white pigment, the painting is made discrete along the longer axial direction, and the length of a painted region or intervals between the painted regions are varied, whereby the scattering distribution is varied along the longer axial direction, so that the illumination intensity distribution along the main scanning direction (longer axial direction) can be uniformed. In the meantime, when the scatterer 11 is made by forming prismatic shapes or embossed shapes on the light guide side surface, the size or intervals of each shape are varied in the same manner, whereby the scattering distribution is varied along the longer axial direction, so that the illumination intensity distribution along the main scanning direction (longer axial direction) can be uniformed.

In the above-described embodiment, a case has been described in which the light sources 5 are arranged on the end surface of the cylindrical light guide 10. The configuration may be in such a way that a large number of light sources such as LEDs are arranged on the back face of the scatterer 11, the light radiated from the light sources is scattered through the scatterer within the cylindrical light guide, part of the scattered light is radiated in the illuminating ray radiating direction in the same manner as the present embodiment, and the rest of the light is confined within the cylindrical light guide, to be scattered again by the scatterer. Here, the back face of the scatterer 11 means the opposite side from the light guide 10 with respect to the side surface of the light guide 10 where the scatterer 11 is painted. When the scatterer 11 is made by painting with white pigment, it is preferable from the viewpoint of efficient use of light that the light sources 5 are arranged in positions that are between the pigment-painted portions and that are not painted with pigment.

In addition, the scatterer 11 can be composed of a plane-luminescence-type self emitting scatterer so as to serve as a light source and a scatterer.

An illumination optical system described in the present embodiment can be used for other devices. By using the illumination optical system for other illuminators, as described in the present embodiment, the light can efficiently illuminate the required illumination area, and the light intensity can be enhanced.

In the meantime, in the above-described embodiment a case has been described in which a cylindrical light guide is used as a light guide 10 and a cylindrical lens is used as a condensing lens 12. However, if an illumination optical system is configured with a light guide having a circular cross-section, a scatterer that is provided on a portion of the circumference of the circular cross-section and that radiates scattering light toward the inside of the light guide, and a condensing lens that condenses light emitted from the light guide and transforms the light into a linear or predetermined size of planar beam, effects similar to those in the present embodiment can be achieved.

For example, in FIG. 3, a spherical light guide is used as a light guide 10, a scatterer 11 is arranged on one portion of the spherical surface of the spherical light guide, and a condensing lens 12 is configured with a convex lens, whereby the rays travel along the arrows illustrated in FIG. 3(a) in the same way as in the above-described embodiment in the shorter axial direction, and the convex lens can condense light also in the longer axial direction, or more specifically, in the direction perpendicular to the paper face in FIG. 3(*a*). Therefore, the light emitted from the light guide can be efficiently transformed into a predetermined size of planar or point-like beam. In addition, in this case, it is better to arrange the light sources 5, for example, in the back side of the scatterer 11.

Embodiment 2

Figure 4:
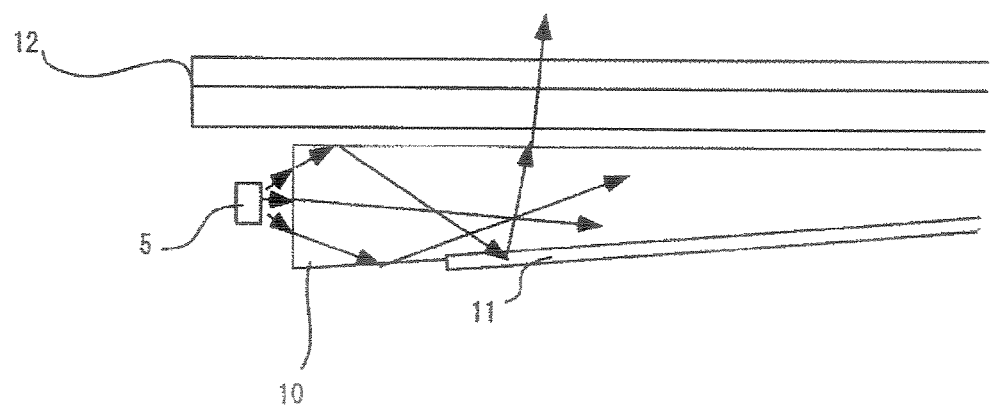
FIG. 4 is a diagram illustrating operations of an illumination optical system of an image reader apparatus according to Embodiment 2 of the present invention.

FIG. 4 is a diagram illustrating operations of an illumination optical system of an image reader apparatus according to Embodiment 2 of the present invention, and illustrates a main-scanning-direction cross-section of the end portion and the intermediate portion of a light guide.

In the present embodiment, the light guide 10 is a circular cone, and a scatterer 11 is provided on the side surface of the cone light guide 10 along its axial direction. A light source 5 is arranged on one end surface of the cone light guide 10. The scatterer 11 scatters light from the light source 5. The condensing lens 12 is a cylindrical lens, and transforms the light emitted from the cone light guide 10 into a linear beam.

In the present embodiment, in the shorter-axial-direction (sub-scanning-direction) cross-section, the rays travel in the same way as in Embodiment 1 illustrated in FIG. 3. An illumination optical system with high scattering-light-use efficiency is achieved as in Embodiment 1. In the main scanning direction, as illustrated in FIG. 4, the configuration of the cone light guide 10 is such that the diameter decreases in the direction in which the light incident from the end surface propagates. Accordingly, the angle of incidence of the scattering light into the inner surface of the light guide in the illuminating ray radiating direction decreases as the light propagates. Therefore, as the light travels close to the top of the circular cone, the total reflection condition becomes unsatisfied. For that reason, as the light travels close to the top of the circular cone, the light becomes easy to be run off out of the light guide. Accordingly, even though light decay is caused by the propagation, the effect of the light decay can be negated by increasing the probability of light outgoing from the light guide so as to compensate the light decay, so that the intensity distribution of the light outgoing from the light guide in the main scanning direction can be uniformed.

In the above-described Embodiment 2, a case has been described in which the light guide 10 is a circular cone. However, the cross-section in the axial direction must be circular, but the shape of a cross-section perpendicular to that cross-section is not necessarily similar to the shape illustrated in FIG. 4. The cross-sectional shape can be a shape the diameter of which becomes smaller with the light propagation in such a way that the intensity distribution is uniform, for example, a shape including a curved line.

In addition, although in the present embodiment a light guide the diameter of which becomes smaller with the light propagation has been described in consideration of the light intensity distribution, when the light guide has a circle form section in the shorter axial direction, even if the cross-sectional shape perpendicular to the circle form section is a different shape, an illumination optical system with high scattering-light-use efficiency is achieved.

Embodiment 3

Figure 5:
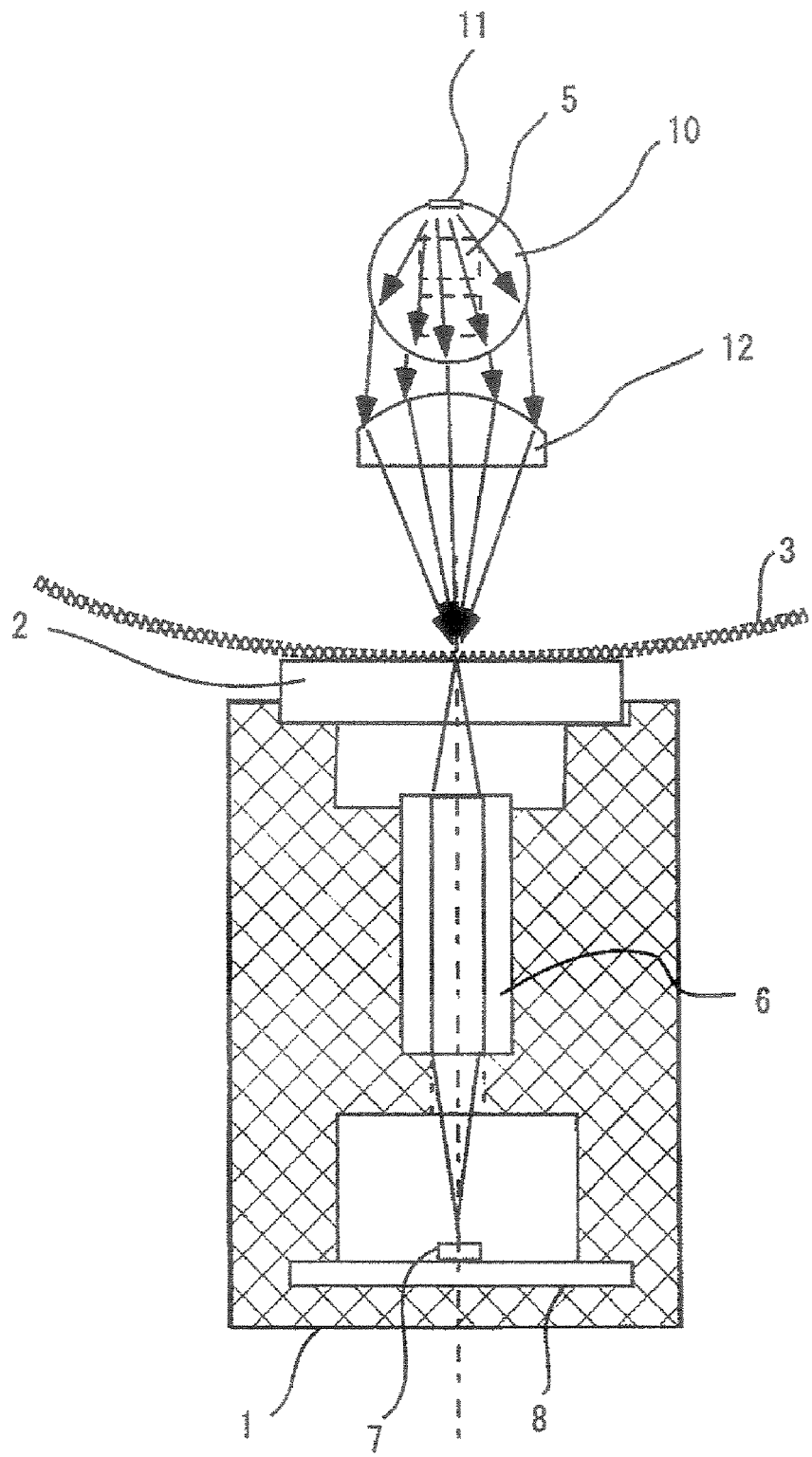
FIG. 5 is a diagram illustrating a shorter-axial-direction (sub-scanning-direction) cross-section of an image reader apparatus according to Embodiment 3 of the present invention.

FIG. 5 is a configuration diagram illustrating a shorter-axial-direction (sub-scanning-direction) cross-section of an image reader apparatus according to Embodiment 3 of the present invention, and illustrates the configuration of the image reader apparatus using transmission-type illumination light.

The illumination optical system in Embodiment 1 is arranged on the backside of the reading surface of the document 3, and the transmission light is guided to the reading optical system.

An image reader apparatus with such a configuration has effects similar to those in Embodiment 1.

Embodiment 4

Figure 6:
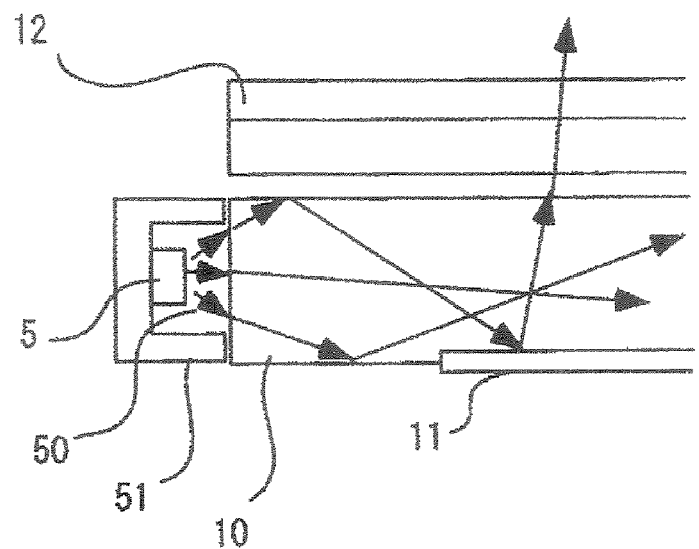
FIG. 6 is a configuration diagram illustrating a main-scanning-direction cross-section of a light incoming face of an illumination optical system relevant to Embodiment 4 of the present invention.

FIG. 6 illustrates a main-scanning-direction cross-sectional configuration of a light incoming face of an illumination optical system relevant to Embodiment 4 of the present invention. A light source 5 is housed in a light source case 51. An air space 50 is left between the light outgoing face of the light source 5 and the end surface of a cylindrical light guide 10.

The light that has been emitted from the light source 5 and has reached the end surface of the cylindrical light guide 10, on entering the cylindrical light guide 10, is refracted at the end surface of the cylindrical light guide due to existence of the air space 50, and all the light except for the end-face reflection is guided into the cylindrical light guide 10. Because the light guided into the cylindrical light guide 10 has been refracted on the end surface, the angle of incidence into the side surface of the light guide becomes large, so that the light satisfying the total reflection condition becomes more than a case with no air space, and the light transmitting within the light guide increases. Therefore, the light guiding efficiency is improved. If the gap between the light outgoing face of the light source 5 and the end surface of the cylindrical light guide 10 is filled with adhesives or the like, refractive indexes of the adhesives and of the cylindrical light guide 10 are at the comparable level. Therefore, the result is approximately the same as the case with no air space, so that the light that has been guided into the cylindrical light guide 10 but does not satisfy the total reflection condition within the cylindrical light guide externally leaks out of the cylindrical light guide 10, to be a loss.

The smaller the distance between the light outgoing face of the light source 5 and the end surface of the cylindrical light guide 10, namely the air space size, the larger the above-described effect of the air space, and the better the light guiding efficiency.

Moreover, although in the present embodiment the air space 50 is left between the light outgoing face of the light source 5 and the end surface of the cylindrical light guide 10, in a case in which the light outgoing face of the light source 5 is in contact with the end surface of the cylindrical light guide 10, if the two are not optically coupled, a minute air space is left. Even in such a case, approximately the same effect as the above-described embodiment can be achieved. Therefore, it is assumed that the air space includes such a minute air space.

Here, it is desirable that an LED the light of which is radiated only from the front face of the package is used for the light source 5.

In addition, it is desirable that the inner face of the light source case 51 is made up with highly reflective material of white color or the like. This increases the possibility that the light that has been emitted from the light source 5 and has not directly entered the cylindrical light guide 10 can be reflected again and guided into the cylindrical light guide 10. This can also enhance the efficiency of the light taken into the cylindrical light guide 10.

Furthermore, when the light scattered by the scatterer 11 is adjusted so as to uniform the intensity distribution of the illumination light on the surface of a document in the main scanning direction, not all of the light is emitted during one way of the light guiding, and the light leaks from the cylindrical light guide end surface opposed to the cylindrical light guide end surface where the light source 5 is arranged. Accordingly, when the light source 5 is arranged only on one end surface of the cylindrical light guide 10, it is desirable that the opposite-side end surface has a light-reflecting structure.

Moreover, the light sources 5 are arranged on both the end surfaces of the cylindrical light guide 10, it is desirable that the package of the light source 5 and the light source case 51 are configured in such a way that highly light-reflective material of white color, silver color, or the like covers the entire end surfaces of the cylindrical light guide 10. Accordingly, the leaking light from the end surfaces of the cylindrical light guide 10 can be reduced.

Embodiment 5

Figure 7:
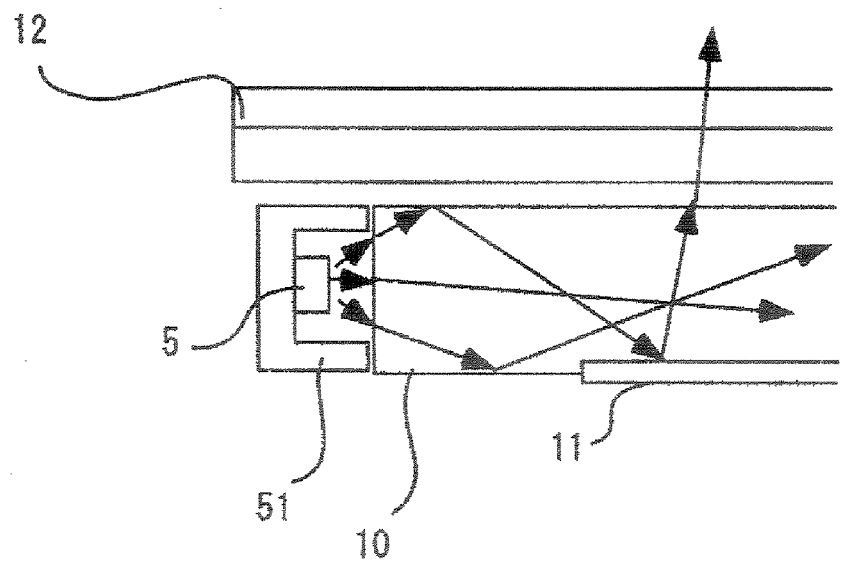
FIG. 7 is a configuration diagram illustrating a main-scanning-direction cross-section of a light incoming face of an illumination optical system relevant to Embodiment 5 of the present invention.

FIG. 7 illustrates a main-scanning-direction cross-sectional configuration of a light incoming face of an illumination optical system relevant to Embodiment 5 of the present invention. A cylindrical lens 12 is longer than a cylindrical light guide 10 in the main scanning direction.

Accordingly, a wider area than the length of cylindrical light guide can be illuminated, so that the apparatus can be downsized.

Embodiment 6

Figure 8:
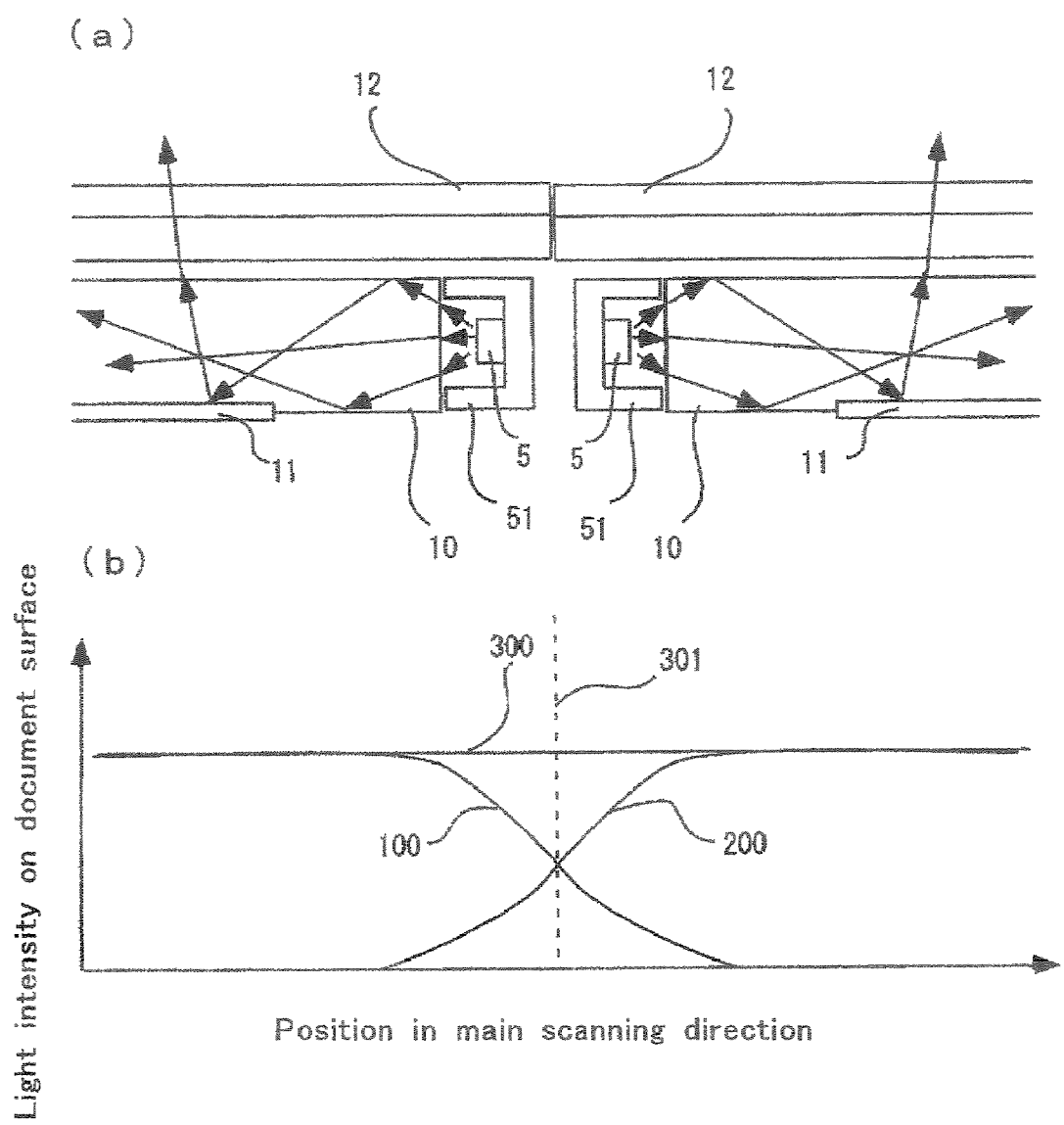
FIG. 8 is a configuration diagram illustrating a main-scanning-direction cross-section of a light incoming face of an illumination optical system relevant to Embodiment 6 of the present invention.

FIG. 8 illustrates a main-scanning-direction cross-sectional configuration of a light incoming face of an illumination optical system relevant to Embodiment 6 of the present invention. In the present embodiment, a plurality of cylindrical light guides and a plurality of cylindrical lenses are axially connected, respectively. FIG. 8(a) illustrates a configuration in which end portions of a first illumination system and a second illumination system are connected.

FIG. 8(b) illustrates the distribution of the light intensity on the surface of a document in the main scanning direction in the configuration in FIG. 8(a). A uniform intensity distribution 300 that is uniform on the document surface can be achieved by adding an intensity 100 on the document surface by the first illumination system and an intensity 200 on the document by the second illumination system. Numeral 301 denotes the connecting point of the first illumination system and the second illumination system.

As described above, a wide document can be illuminated by connecting a plurality of illumination systems. In addition, by shortening each illumination system and connecting a plurality of illumination systems, the light intensity on the document surface can be enhanced, so that high-speed reading can be achieved.

Embodiment 7

Figure 9:
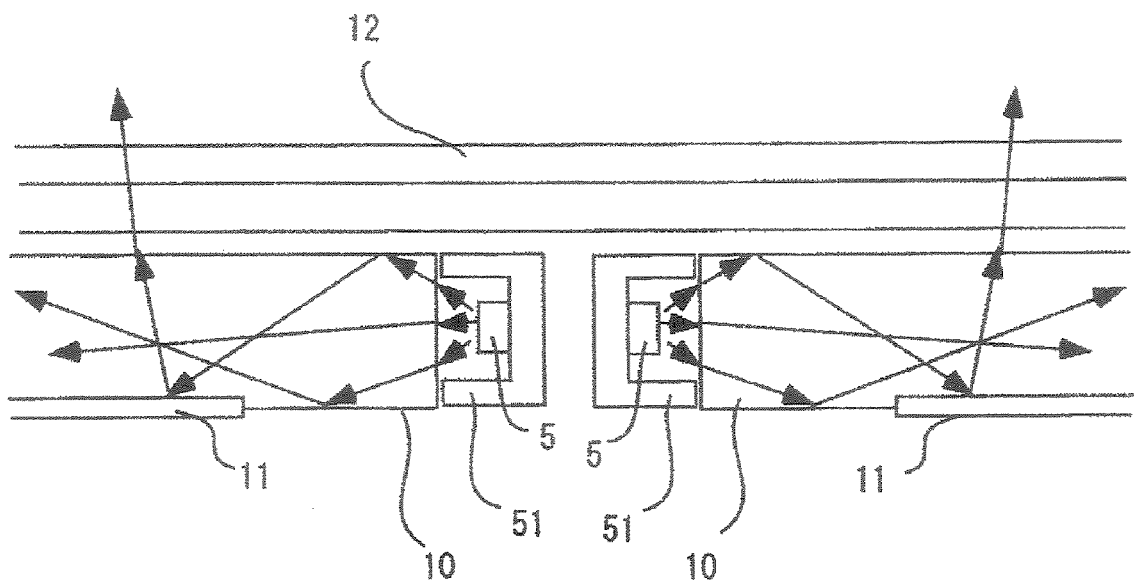
FIG. 9 is a configuration diagram illustrating a main-scanning-direction cross-section of a light incoming face of an illumination optical system relevant to Embodiment 7 of the present invention.

FIG. 9 illustrates a main-scanning-direction cross-sectional configuration of a light incoming face of an illumination optical system relevant to Embodiment 7 of the present invention. The cylindrical lenses 12 in Embodiment 6 are combined as a unit.

The disturbance (fluctuation) in the intensity distribution at the connecting portion can be suppressed, and the number of components can be reduced.

In addition, in the present embodiment, a case has been described in which two illumination systems are combined, when three or more illumination systems are connected, if the number of the cylindrical lenses 12 is smaller than the number of the cylindrical light guides 10, effects similar to the present embodiment can be achieved.

Embodiment 8

Figure 10:
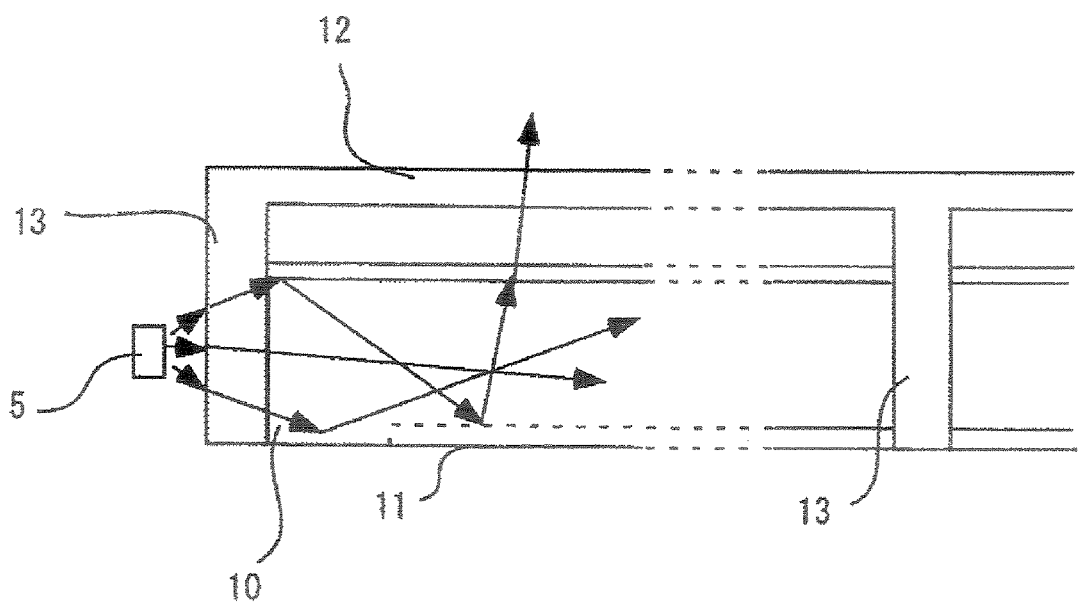
FIG. 10 is a configuration diagram illustrating a main-scanning-direction side face of a light incoming face and an intermediate portion of an illumination optical system relevant to Embodiment 8 of the present invention.

FIG. 10 illustrates a main-scanning-direction side face configuration of a light incoming face and an intermediate portion of an illumination optical system relevant to Embodiment 8 of the present invention. In the present embodiment, a cylindrical light guide 10 and a cylindrical lens 12 are connected at the end portion and at the intermediate portion. A connecting portion 13 is integrally formed with the cylindrical light guide 10 and the cylindrical lens 12.

Accordingly, the spatial relationship between the cylindrical light guide and the cylindrical lens can be precisely arranged. In addition, the cylindrical light guide and the cylindrical lens are made by integral forming, whereby the number of components can be reduced.

Here, given that the sum of the length of the connecting portions 13 in the main scanning direction is 1% of the entire length, for example, the light loss can be suppressed to around 1%.

Embodiment 9

Figure 11:
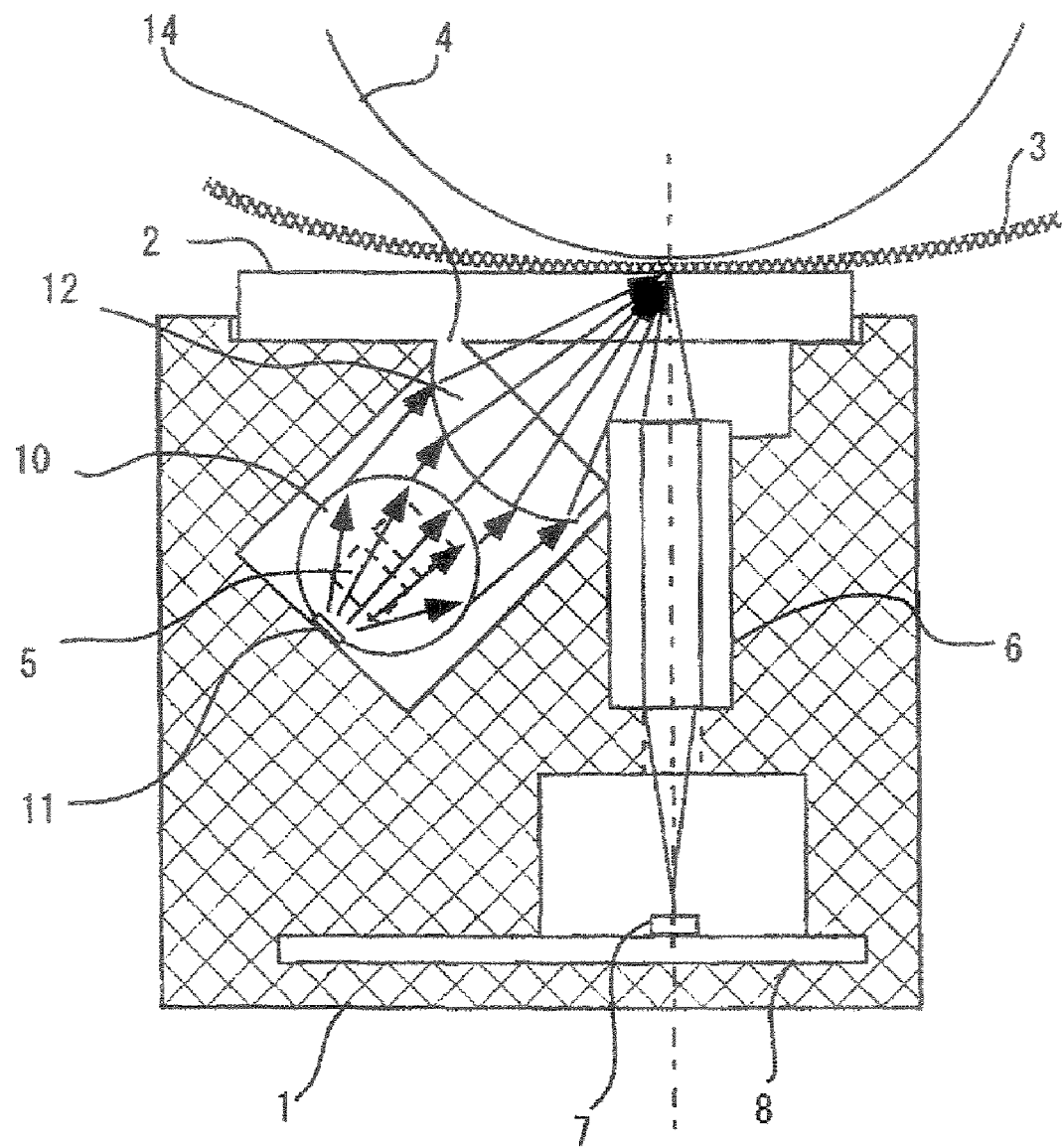
FIG. 11 is a diagram illustrating a shorter-axial-direction (sub-scanning-direction) cross-section of an image reader apparatus according to Embodiment 9 of the present invention.

FIG. 11 is a diagram illustrating a shorter-axial-direction (sub-scanning-direction) cross-section of an image reader apparatus according to Embodiment 12 of the present invention. A cylindrical lens 12 and a cover glass 2 are connected at a connecting portion 14, whereby the cylindrical lens 12 and the cover glass 2 are combined as a unit.

The document 3 and the cylindrical lens 12 can be arranged in such a way that their spatial relationship is precise, and the number of components can be reduced.

Embodiment 10

Figure 12:
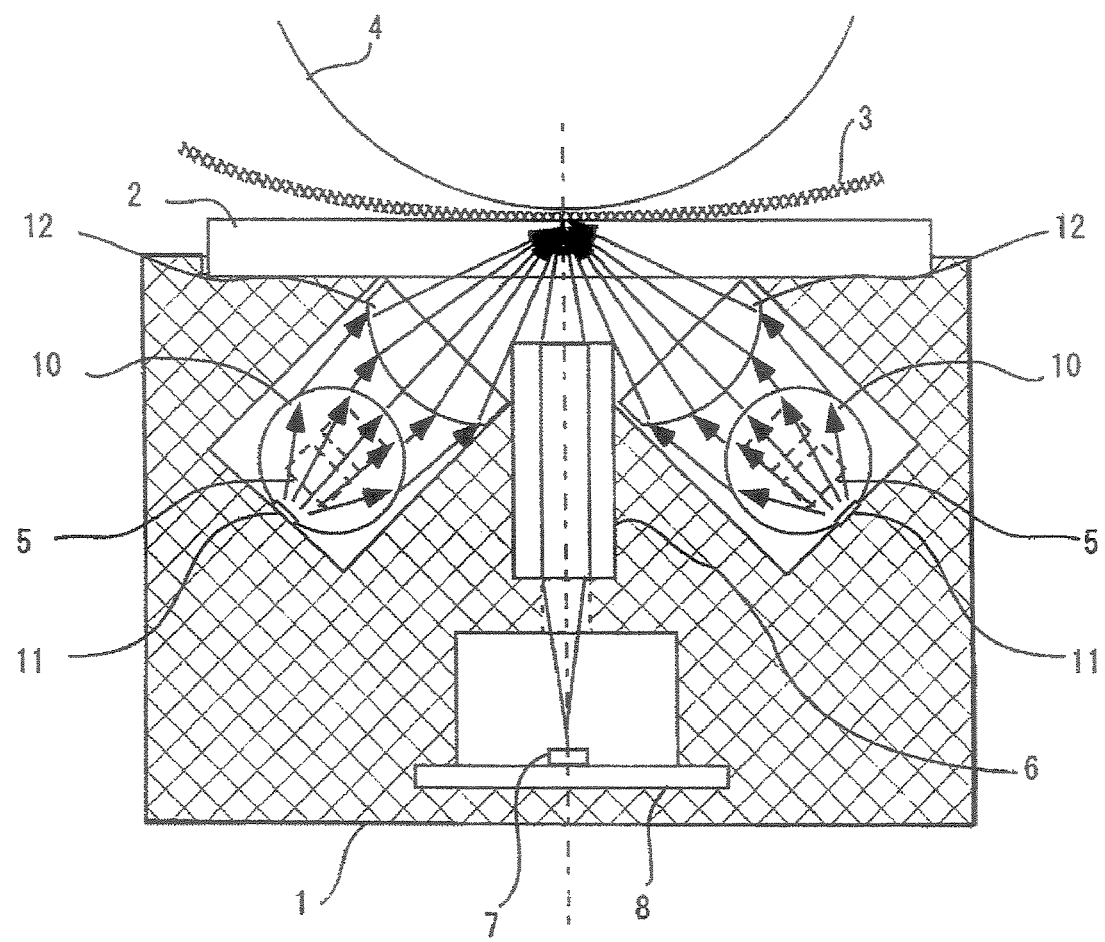
FIG. 12 is a diagram illustrating a shorter-axial-direction (sub-scanning-direction) cross-section of an image reader apparatus according to Embodiment 10 of the present invention.

FIG. 12 is a diagram illustrating a shorter-axial-direction (sub-scanning-direction) cross-section of an image reader apparatus according to Embodiment 10 of the present invention. The configuration is such that two arrays of illumination systems are arranged so as to sandwich a rod lens array 6, to illuminate the document surface by a plurality of illumination systems.

The document surface is illuminated from both sides, whereby the light intensity can be enhanced, and the shade of wrinkles on the document surface can be reduced, so that the wrinkles can be prevented from being read.

Embodiment 11

Figure 13:
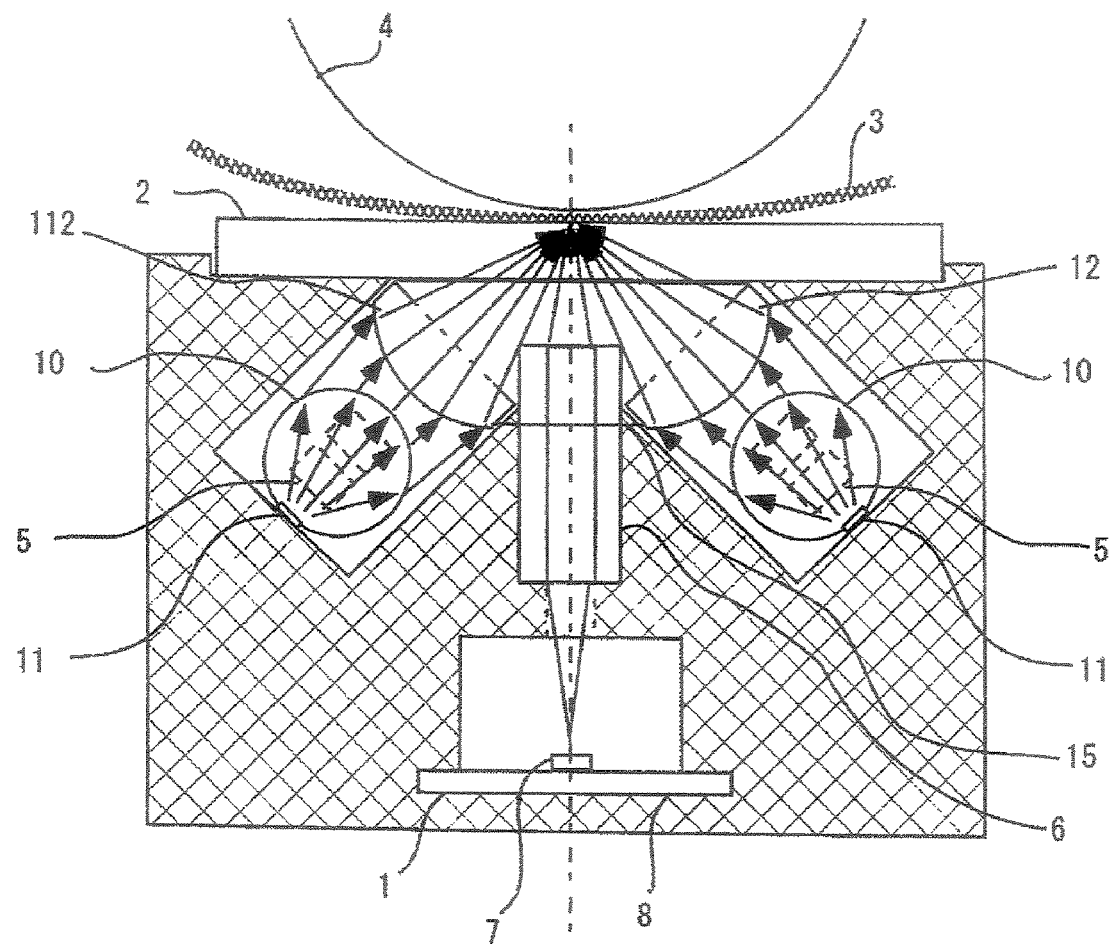
FIG. 13 is a diagram illustrating a shorter-axial-direction (sub-scanning-direction) cross-section of an image reader apparatus according to Embodiment 11 of the present invention.

FIG. 13 is a diagram illustrating a shorter-axial-direction (sub-scanning-direction) cross-section of an image reader apparatus according to Embodiment 11 of the present invention. Based on the configuration described in Embodiment 10, two arrays of cylindrical lenses 12 are integrated as a unit so as to sandwich the rod lens array 6.

Figure 14:
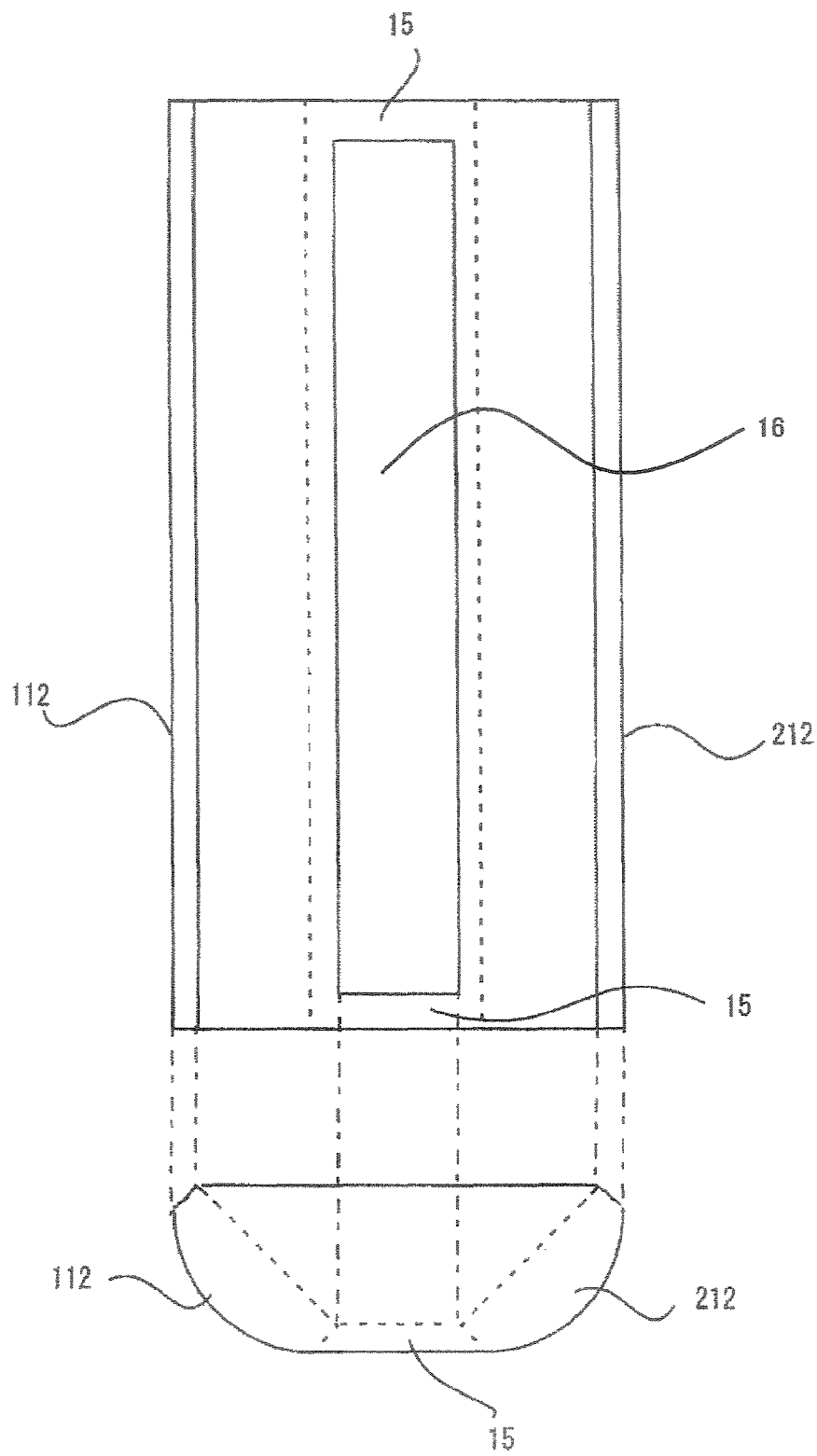
FIG. 14 illustrates a configuration of a cylindrical lens 12 according to Embodiment 11 of the present invention.

FIG. 14 illustrates a configuration of the cylindrical lens 12 according to Embodiment 11. End portions of two cylindrical lenses 112 and 212 are connected at a connection portion 15. The rod lens array 6 is inserted in an air space 16 between the two cylindrical lenses 112 and 212.

The reading optical system and the cylindrical lens can be arranged in such a way that their spatial relationship is precise, and the number of components can be reduced.

Embodiment 12

Figure 15:
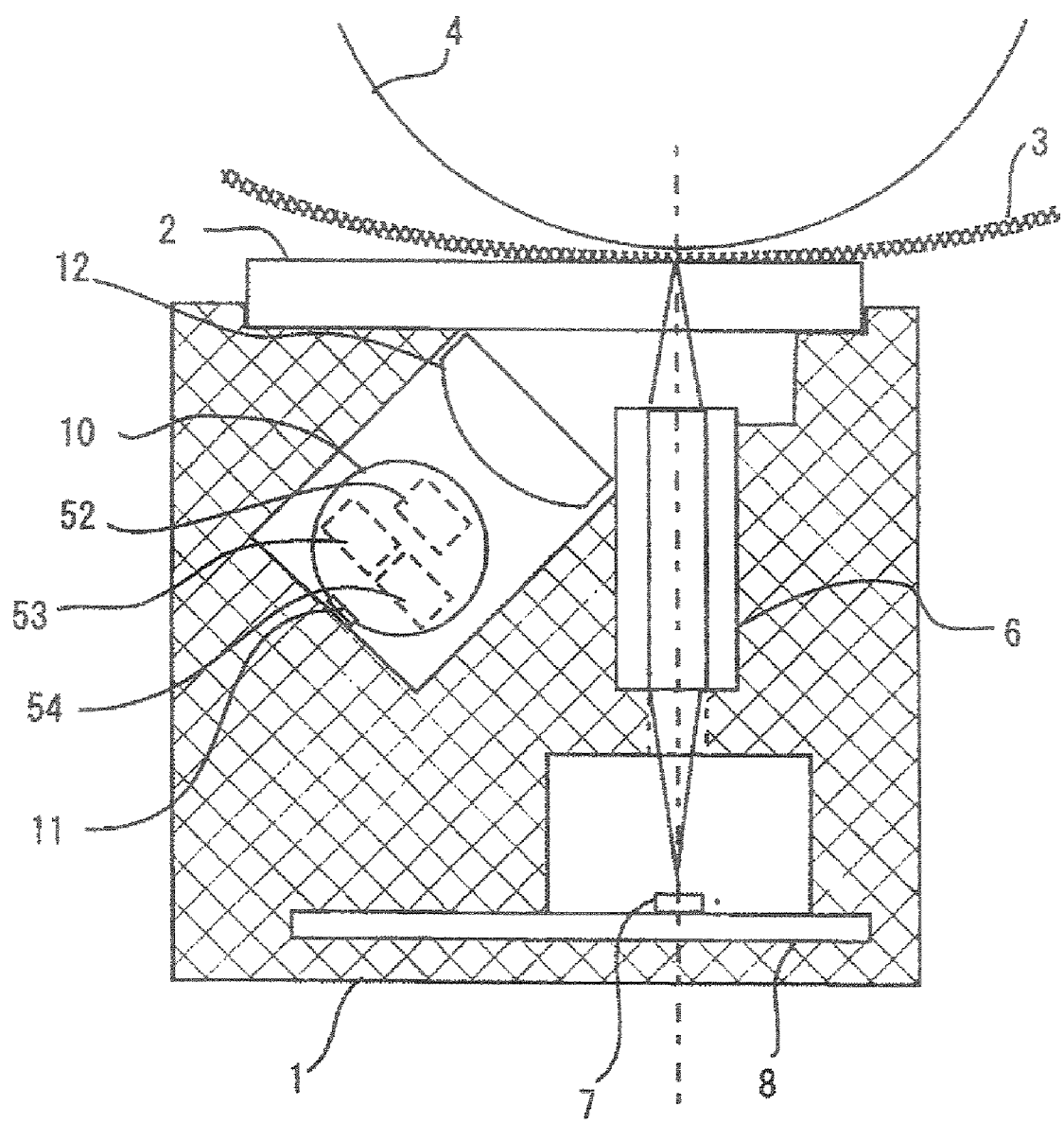
FIG. 15 is a diagram illustrating a shorter-axial-direction (sub-scanning-direction) cross-section of an image reader apparatus according to Embodiment 12 of the present invention.

FIG. 15 is a diagram illustrating a shorter-axial-direction (sub-scanning-direction) cross-section of an image reader apparatus according to Embodiment 12 of the present invention. A plurality of light sources, which are a red color light source 52, a green color light source 53, and a blue color light source 54 here, are arranged on an end surface of a cylindrical light guide 10. The light sources are housed in a light source case 51, which is not illustrated.

Using three-color light sources for the illumination system as described above enables color reading. In addition, by selecting a wavelength of the light source, such as an infrared light or an ultraviolet light, information with respect to a specific wavelength can be selectively read. Using such a plurality of light sources different in wavelength, any of the above-described effects can be obtained selectively.

What is claimed is:

1. An illuminator comprising:
   a light guide having a circular cross-section;
   a scatterer that is provided on a portion of a circumference of the circular cross-section and that radiates scattering light toward the inside of the light guide; and
   a condensing lens that condenses light emitted from the light guide and transforms the light into a linear beam, wherein a plurality of cylindrical light guides each separately illuminated by its own light source, and a plurality of cylindrical lenses are axially connected, respectively.

2. An illuminator according to claim 1, wherein the light guide and the condensing lens are integrally formed.

3. An illuminator according to claim 1, wherein
   the light guide is cylindrical;
   the scatterer is provided on a side surface of the cylindrical light guide along its axial direction; and
   the condensing lens is a cylindrical lens, and transforms the light emitted from the cylindrical light guide into a linear beam.

4. An illuminator according to claim 1, wherein
   the light guide is a circular cone;
   the scatterer is provided on a side surface of the cone light guide along its axial direction, and scatters light from a light source provided on a bottom face of the cone light guide; and
   the condensing lens is a cylindrical lens, and transforms the light emitted from the cone light guide into a linear beam.

5. An illuminator according to claim 3, wherein the scatterer scatters light from light sources provided on both axial end surfaces of the cylindrical light guide or from a light source provided on one axial end surface of the cylindrical light guide.

6. An illuminator according to claim 5, wherein an air space is left between the cylindrical light guide and the light source.

7. An illuminator according to claim 1, wherein the scatterer scatters light from a light source that emits light of a plurality of wavelengths.

8. An image reader apparatus comprising:
   a transparent plate on which a document is placed;
   an illuminator according to claim 1, which irradiates with light a document surface where the document is placed;
   an optical system that condenses light reflected on the document surface, or light transmitted through the document surface; and
   a sensor that is provided in an imaging portion of the optical system and reads an image of the document, wherein a plurality of cylindrical light guides each separately illuminated by its own light source, and a plurality of cylindrical lenses are axially connected, respectively.

* * * * *